United States Patent [19]

Porter

[11] Patent Number: 4,915,023
[45] Date of Patent: Apr. 10, 1990

[54] ALUMINUM AIR VENT OF LOUVER

[76] Inventor: Bryant E. Porter, 553 West, 9460 South, Sandy, Utah 84070

[21] Appl. No.: 352,968

[22] Filed: May 17, 1989

[51] Int. Cl.4 .............................................. F24F 13/08
[52] U.S. Cl. .................................... 98/121.1; 403/401
[58] Field of Search ........................ 98/29, 114, 121.1; 403/401, 402

[56] References Cited

U.S. PATENT DOCUMENTS

| | | | |
|---|---|---|---|
| 1,690,948 | 11/1928 | Rote | 98/114 |
| 2,309,717 | 2/1943 | Siebenlist | 98/121.1 |
| 2,340,570 | 2/1944 | Siebenlist | 98/121.1 |
| 2,587,509 | 2/1952 | Moyer et al. | 98/121.1 |
| 3,345,930 | 10/1967 | Ammons | 98/114 |
| 4,738,191 | 4/1988 | Porter | 98/121.1 |

FOREIGN PATENT DOCUMENTS

| | | | |
|---|---|---|---|
| 1961701 | 8/1970 | Fed. Rep. of Germany | 98/121.1 |
| 119496 | 5/1970 | Norway | 98/121.1 |

*Primary Examiner*—Harold Joyce

[57] ABSTRACT

A decorative self-channeling louver or air vent for flush mounting to exterior walls of building comprises a wooden frame having a polygonal shape, a plurality of aluminum fins resembling wooden slate, and an aluminum facing resembling wood brick molding, The aluminum facing is formed around the wood frame and includes novel interlocking means for interengaging abutting outside corners of the aluminum members and creating the self-channeling effect on the outside perimeter of the air vent or louver.

13 Claims, 2 Drawing Sheets

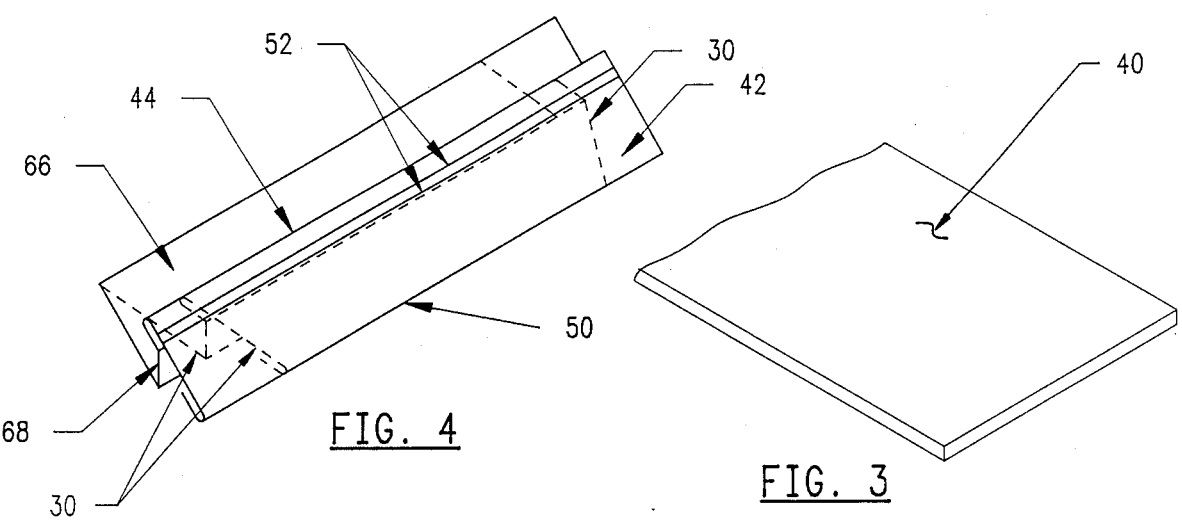
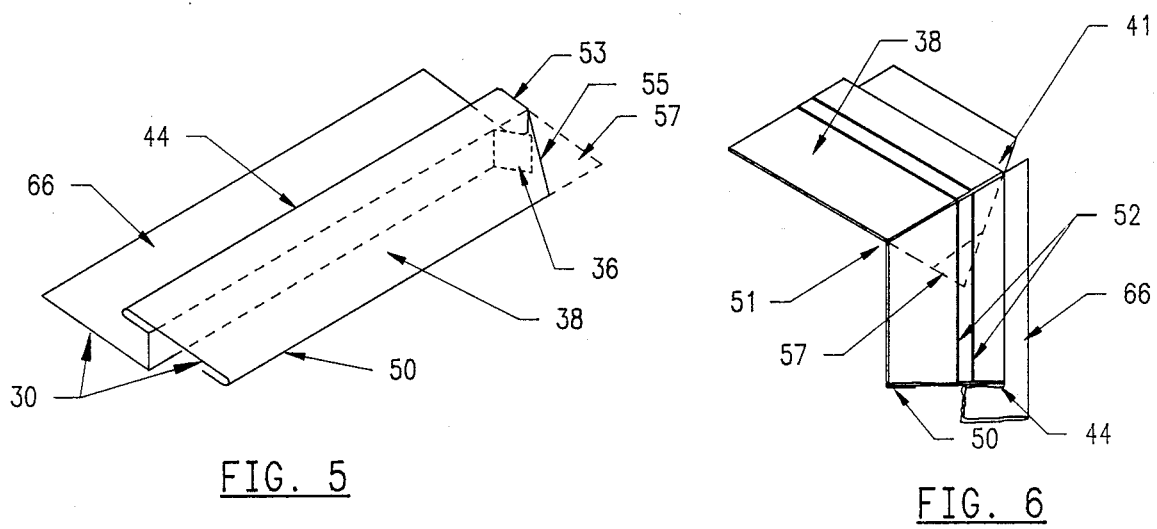
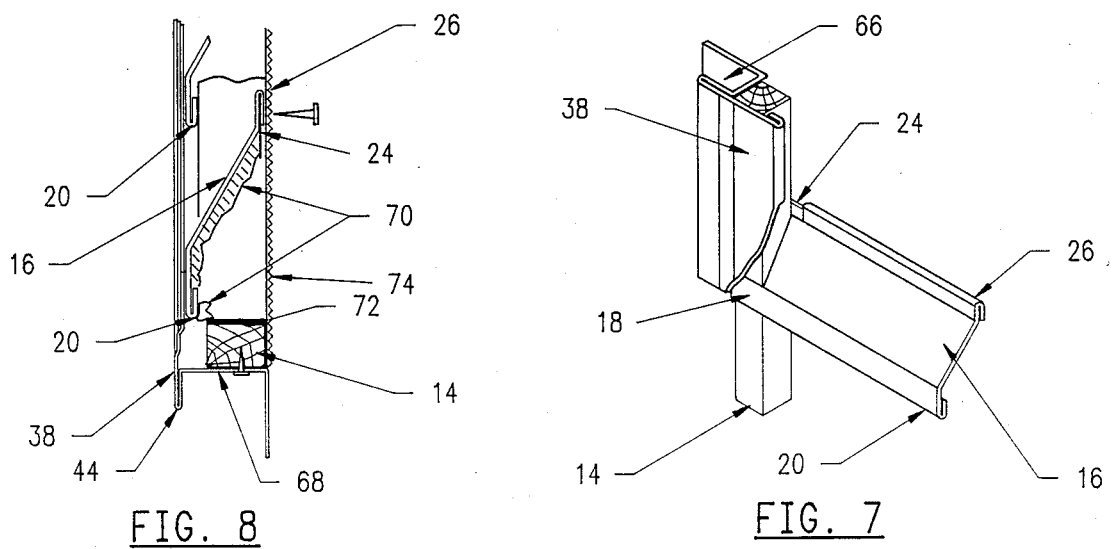

ALUMINUM AIR VENT OF LOUVER

BACKGROUND OF THE INVENTION

The invention relates to air vents or louvers used on exterior walls of buildings, and in particular to aluminum faced air vents or louvers which resemble wooden air vents and louvers.

It is customary and generally necessary to provide air vents for attic space beneath the roof of a residential building. The wooden air vents or louvers were attractive as well as functional. The drawback with wooden air vents or louvers is in their constant need of maintenance.

Aluminum siding has been used to reduce the maintenance needed by various types of wood sidings. Aluminum vents or louvers have also been used. However, the aluminum vents unfortunately resemble a metal grating much more closely than they do wooden air vents or louvers. In both wood and aluminum air vents or louvers, channel is added to accommodate aluminum or vinyl siding.

This patent application has many of the same components as U.S. Pat. No. 4,738,191, which belongs to the same inventor Bryant Porter. However, the main emphasis of this application is in the novel interlock at the outside hem bends, and the self-channeling effect that is created.

SUMMARY OF THE INVENTION

It is principal object of the present invention to provide a flush mount, self-channeling air vent or louver which is made of factory-painted aluminum but closely resembles such a louver or air vent made of wood.

A further object of the invention is to provide a sturdy, flush mount air vent or louver comprising an aluminum facing resembling wood brick mold which is formed around a wooden frame and which includes novel interlocking means for inter-engaging abutting outside corners of aluminum members on the exterior face of the air vent or louver, causing a self channeling effect, to facilitate the installation of aluminum or vinyl siding.

Another object of the invention is to provide an air vent or louver of the type decribed in the previous paragraph which further comprises fin members formed from aluminum sheet stock, with each fin having a substantially flat front portion lying in the plane of the exterior face of the air vent or louver and with each fin further having a flat sloping portion which slopes from the exterior face of the air vent or louver to the back face thereof.

An additional object of the invention is to provide an air vent or louver of the type described in the previous paragraph which further comprises novel means for anchoring the front and back corners of the fin members to the respective wood faces of the air vent or louver frame.

A further object of the invention is to provide a novel method of making an aluminum faced air vent or louver of the general type disclosed herein.

The above and other objects of the invention are realized in specific illustrated embodiments which will be described in detail hereinafter. In general, the air vent or louver of this invention comprises a wood frame consisting of a plurality of wooden members attached end to end to form an enclosed, polygonal frame.

A plurality of spaced aluminum fins extend from one side of the wood frame to the other, and means are provided for anchoring the front corners of the fins to the front face of the wood frame and for anchoring the back corners of the fins to the back face of the wood frame.

Sectional aluminum face moldings are formed around the wood frame. The face molding comprises an elongated sheet of aluminum which has been bent several times along its longitudinal length to form an elongated C channel, with a hem bend to accommodate an integrated decorative face. This molding is used to face and trim the fins of the louver, and is self-channeling for vinyl and aluminum siding. The back side of the C channel serves as a nailing fin for surface mounting against the wall to which it is to be attached. This face molding is then cut at an angle into sections somewhat longer then the length of the polygonal sides at the perimeter of the wood frame. Two small slices are cut at the bottom of the channel on one end of each section to allow folding at the corners of the wooden frame. These sections are formed around the wooden frame, with the decorative face extending inward from the perimeter of the hem bends in the plane of the front face of the wood frame. The perimeter of the hem bends is greater than the perimeter of the wood frame.

Means are provided for interlocking the outside part of the decorative face at the channeling area, said means comprising of hem bends formed at the outside front portion of the face moldings, whereas a hem bend of one section receives a flange of the adjacent section. Thus the hem bends are abutted up closely, forming a sturdy junction.

Means are provided for interlocking the inside portion of the decorative face, said means comprising of hem bends formed at the inside portion of the face moldings, whereas a hem bend of one section receives the hem bend and flange of the adjacent section, thus forming a sturdy junction.

The decorative face sections are preferably provided with parallel soft bends spaced from the hem bend. The parallel bends in the decorative face resemble parallel, decorative ridges in wooden brick molding, giving the entire air vent or louver the appearance of wood.

The aluminum self-channeling decorative molding sections are then placed on by one around the finned wooden box, making sure that the miters of the aluminum molding sections line up with the miters of the wooden box. These are stapled or nailed into place.

Additional objects, features and advantages of the invention will become apparent from the following detailed description, taken together with the accompanying drawings.

THE DRAWINGS

Particular embodiments of the present invention representing the best mode presently contemplated of carrying out the invention are illustrated in the accompanying drawings in which:

FIG. 3 is a fragmentary pictorial of a strip of sheet aluminum which is used to make the decorative self-channeling face molding and fins of the present invention;

FIG. 4 is a fragmentary pictorial of a decorative self-channeling face molding that has been formed from the strip of sheet aluminum of FIG. 3. It also shows the two soft bends that give it the appearance of being made of wooden brick molding;

Figure 1:
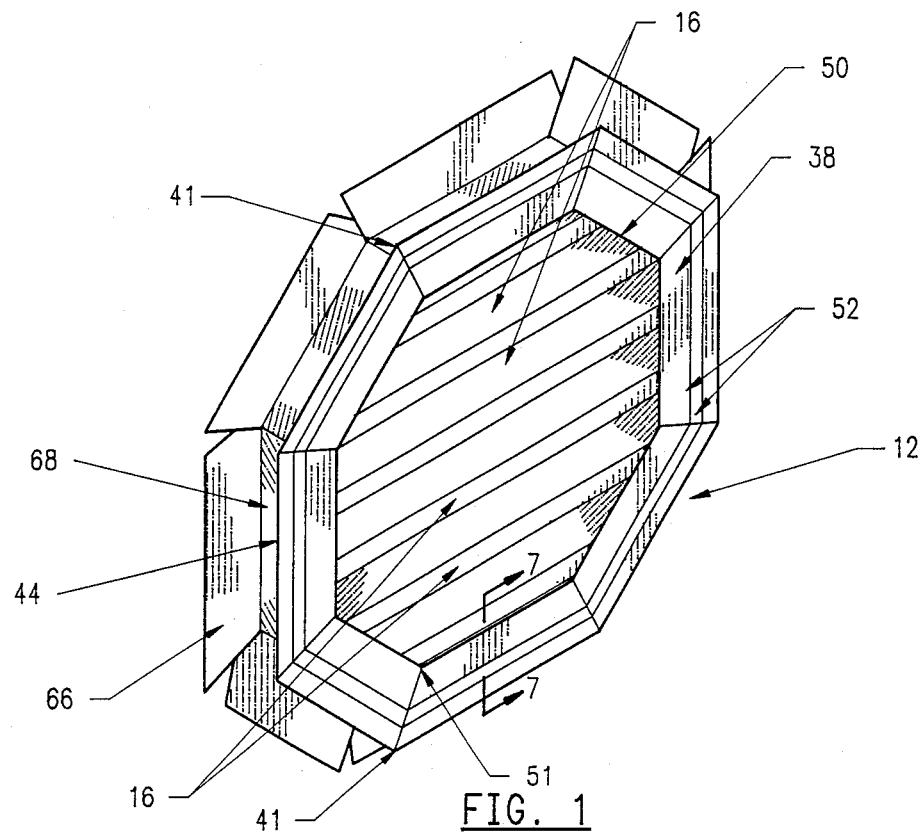
FIG. 1 is a pictorial view of an air vent or louver in accordance with the present invention.

FIG. 5 is a miter cut section of the face molding that has been formed from the decorative self-channeling face molding of FIG. 4. It also shows two small slices cut at the bottom of the channel on the non-mitered end of each section, and the free aluminum tab is shown bent to be later formed around the wooden frame. The two soft bends are not displayed to add clarity to this figure;

FIG. 6 is a fragmentary pictorial showing two sections of face moldings of FIG. 5 being fit together, having interlocking points at the inside and outside hem bends;

FIG. 7 is a fragmentary pictorial of a side member of the wood frame showing means of attaching the corners of the fins to the wooden frame members; and FIG. 8 is a cross-section of the lower portion of the air vent or louver as taken along line 7—7 of FIG. 1;

DETAILED DESCRIPTION OF THE ILLUSTRATED EMBODIMENTS

Referring to the drawings, in particular to FIGS. 1-7, there is shown a particularly preferred embodiment of an air vent or louver in accordance with the present invention. The air vent or louver is shown generally by the reference number 12 and will be hereinafter referred to as louver 12. As illustrated, the louver 12 has the shape of a regular octagon whose included angles are all equal and whose sides are all equal in length. Although the louver 12 as shown is a preferred shape, it is to be expressly recognized that the shape can be varied such that the louver 12 can have any desired polygonal shape. Another preferred shape which is not illustrated is that of a rectangle.

Figure 2:
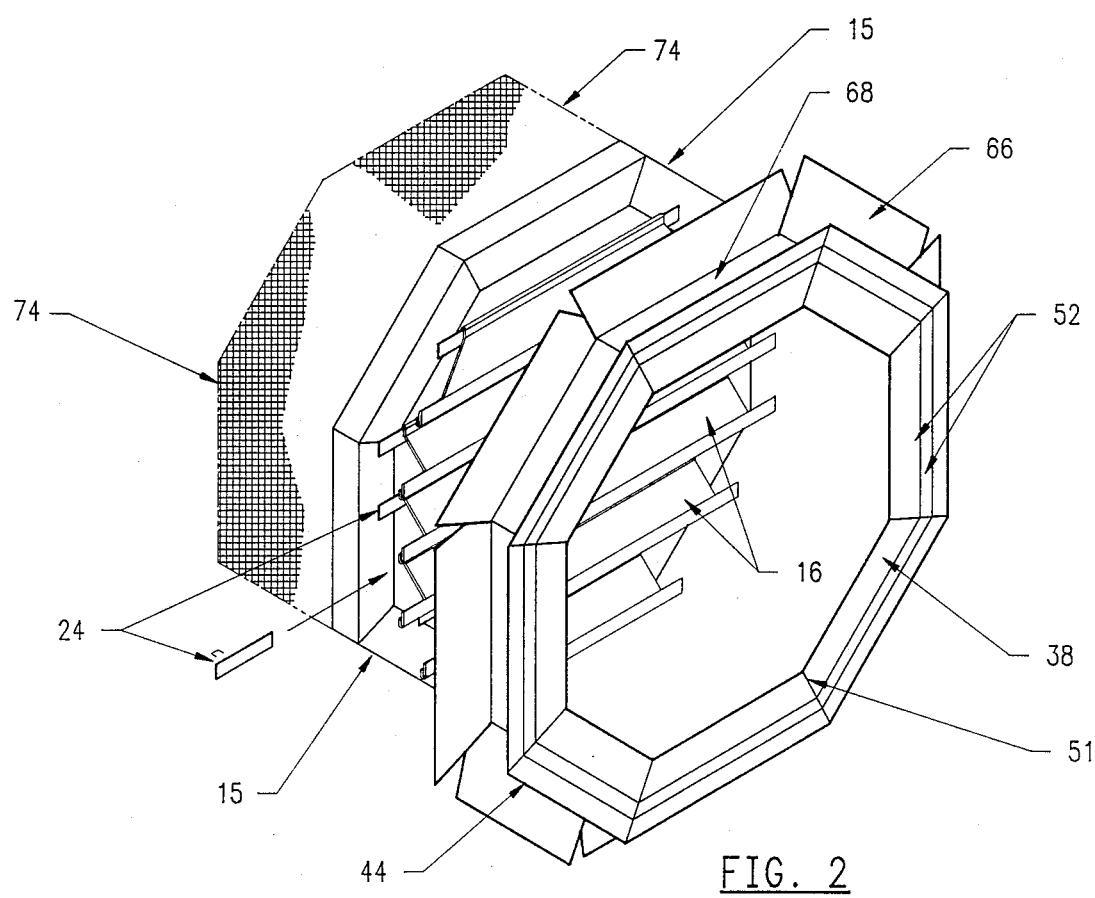
FIG. 2 is a blown up pictorial of the air vent or louver of FIG. 1.

The louver 12, in accordance with the invention, comprises a wood frame consisting of a plurality of elongated wooden members 14. The wooden members 14 are attached together in end-to-end arrangement to form the enclosed polygonal frame as best illustrated in FIG. 2. The wood frame 15 has a broad, flat, open front face which may be also referred to as the exterior or outer face thereof as well as the exterior or outer face of the louver 12 as a whole. The wood frame 15 also has a broad, flat, open back face. For most sizes of air vents or louvers used in residential construction, the wooden members 14 are made of milled wood of ¾ inches by ¾ inches. For larger air vents or louvers 12, the milled wood could be larger for strength.

The wood frame 15 must be held secure and rigid to hold its shape. Preferably, the elongated wooden members 13 are mitered and securely attached to each other by mechanical fasteners such as nails or staples as well as by glue.

A plurality of spaced aluminum fins 16 extend from one side edge of the wooden frame 15 to the opposite side edge. The aluminum fins 16 are made to resemble wooden slats. To that end, each of the fins 16 is bent from a piece of aluminum sheet 40 to have a substantially flat front portion lying substantially in the plane of the front face of the wood frame 15. Each fin 16 further has a substantially flat sloping portion which slopes from the front face of the wood frame 15 to the back face of the wood frame 15.

Means are provided for securely anchoring the respective front corners of each of the fins 16 to the edges of the wood frame 15 at the front face thereof. As shown in FIGS. 2, 7 and 8, the means for anchoring the respective front corners of the fins 16 to the edges of the wood frame 15 comprises tabs 18 formed at the front corners of the fins 16. The tabs 18 extend flatwise over the front side edge, and nails or staples can be driven through the tabs 18 to securely attach the front of the fins 16 to the front of the wood frame 15. The longitudinal free edges of the flat front portions of the fins 16 are preferably bent back upon themselves to form hem bends 20. The hem bends 20 make a finished edge for the fins 16 and add strength and stability to the front edges of the fins 16.

Means are further provided for anchoring the respective back corners of each of the fins 16 to the back edges of the wood frame 15 at the back face thereof. As shown in FIGS. 2, 7 and 8, the anchoring of the back corners of the fins 16 is accomplished by a unique novel application of small aluminum tabs 24. These tabs are wedged between the hem bend 26 (FIG. 8) on the back edge of the fin 16. These tabs are then attached to the wood frame 15, and add strength and stability to the back edges of the fins 16.

The outer face and radial perimeter of the wood frame 15 is covered by sectional aluminum self-channeling face molding 42. These face moldings 38 finish the perimeter of the louver 12 and is made such that the molding resembles wooden brick molding. The face molding 42 comprises an elongated sheet 40 of aluminum as shown in FIG. 3. The sheet 40 is bent several times along its longitudinal length to form an elogated C channel 68, with a hem bend 44 to accommodate an integrated decorative self-channeling face molding 42. This molding is used to face and trim the fins 16 of the louver 12, and is self-channeling for vinyl and aluminum siding. The back side of the C channel serves as a nailing fin 66 for surface mounting to the wall. This face molding 42 is then cut at an angle into sections 38, somewhat longer than the length of the polygonal sides at the perimeter of the wood frame 15. Two small slices are cut at the bottom of the channel on the non-mitered end of each section to allow folding of the free aluminum tab 36 at the corners of the wooden frame 15. These sections 38 are formed around the wooden frame 15, with the decorative face extending inward from the perimeter of the hem bends 44 in the plane of the front face of the wood frame 15.

Means are provided for interlocking the outside part of the decorative face 38 at the hem bend 44, whereas the hem bend 44 of one section receives a flange 53 of the adjacent section 38, thus the hem bends are abutted up closely, forming a sturdy junction. 41 indicates this outside interlock.

The inside edge of the decorative face 38 is bent back upon itself to form a hem bend 50. The hem bend 50 adds stability to the edge and finishes the edge of the molding 38. This hem bend 50 also accommodates another interlock 51 at the inside point of the face molding 38. This is accomplished when the inside hem bend 50 of one section receives the inside hem bend 50 and flange 55 of the adjacent section, thus forming a sturdy junction, as is best shown in FIG. 6. 51 indicates this inside interlock.

The decorative face sections 38 are preferably provided with parallel soft bends 52 spaced from the hem bend. The parallel soft bends 52 in the decorative face 38 resemble parallel, decorative ridges in wooden brick molding, giving the entire louver 12 the appearance of wood.

Before placing the self-channeling aluminum decorative molding sections 38 on the wooden frame 15, it sometimes becomes necessary to cut a small triangle piece of aluminum 57 off the sections to allow the sections to be easily placed. In the case of rectangles, this piece must be taken out to avoid interference between the pointed aluminum 57 and the inside of the self-channeling portion 44 of the adjacent section.

The self-channeling aluminum decorative molding sections 38 are then placed one by one around the finned wooden box 15, making sure that the miters of the aluminum molding sections 38 line up with the miters of the wooden box 14. These are stapled or nailed in place.

To divert rainwater away from the opening in the wall and the wall to which the louver 12 is attached, the fin 16 which is closest to the lower end of the louver is sealed along its side edges and bottom to the wooden frame 15 and the decorative front face 38. A bead of silicone sealant and adhesive is shown by the number 70 in FIG. 7. Other sealant materials could be used.

The interior side of the wood frame 15 can be painted if desired or an elongated strip 72 of aluminum can be applied as shown in FIG. 7, if desired. A bug screen 74 is applied to the back side of the louver 12 to stop insects from entering the attic area through the louver 12.

It is to be understood that the above-identified arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

I claim:

1. An aluminum-faced air vent or louver which is adapted to be flush-mounted to an exterior wall of a building, said louver comprising
    a wood frame consisting of a plurality of elongated wooden members attached end to end to form an enclosed polygonal frame;
    a plurality of spaced aluminum fins extending from one side edge of the wood frame to the opposite side edge thereof, each of said fins having a substantially flat front portion lying substantially in the plane of the front face of said wood frame, with each of said fins further having a substantially flat sloping portion which slopes from the front face of said frame to the back face thereof;
    means for anchoring the respective front corners of each of said fins to the edge of said wood frame at the front face thereof;
    means for anchoring the respective back corners of each of said fins to the edge of said wood frame at the back face thereof;
    an aluminum face molding made from an elongated sheet of aluminum which has been bent several times along its longitudinal length to form an elongated C channel, with a hem bend to accommodate an integrated decorative face, said molding having a nailing flange on the back side, said molding further being cut at an angle into sections somewhat longer than the length of the polygonal sides at the perimeter of the wood frame, said sections further being cut with two small slices cut at the bottom of the channel on the non-miter end of each section to allow folding at the corners of the wooden frame, said sections further being bent and formed around the wooden frame with the decorative face extending inward from the perimeter of the hem bends in the plane of the front face of the wood frame; and
    means are provided for interlocking the outside part of the decorative face at the channeling area, said means comprising of hem bends formed at the outside front portion of the face moldings, whereas a hem bend of one section receives a flange of the adjacent section, thus the hem bends are abutted up closely, forming a sturdy junction.

2. An aluminum-faced air vent or louver in accordance with claim 1, wherein means are provided for interlocking the inside portion of the decorative face, said means comprising hem bends formed at the inside portion of the face moldings, whereas a hem bend of one section receives the hem bend and flange of the adjacent section, thus forming a sturdy junction.

3. An aluminum faced air vent or louver in accordance with claim 1, wherein the elongated wooden members are mitered and securely attached to each other by a mechanical fastener and/or by glue to form a stable wood frame.

4. An aluminum-faced air vent or louver in accordance with claim 1, wherein a pair of parallel soft bends are formed in the decorative face of the face molding such that it has the appearance of being made of wooden brick molding.

5. An aluminum-faced air vent or louver in accordance with claim 1, wherein the fin which is closest to what is intended to be the lower end of the air vent or louver is sealed along its side edges and bottom to the wooden frame and first face of said face molding respectively to direct rainwater to the outer face of said air vent or louver.

6. An aluminum-faced air vent or louver in accordance with claim 1, wherein means are further provided for anchoring the respective front corners of said fins to the edges of said wood frame.

7. An aluminum faced air vent or louver in accordance with claim 6, wherein the means for anchoring the respective front corners of said fins to the edges of said wood frame comprises tabs formed at the front corners of said fins with the tabs being securely attached to the edges of the wood frame.

8. An aluminum-faced air vent or louver in accordance with claim 1, wherein means are further provided for anchoring the respective back corners of each of said fins to the edges of said wood frame.

9. An aluminum-faced air vent or louver in accordance with claim 8, wherein the means for anchoring the respective back corners of each of said fins to the edges of said wood frame comprises a longitudinal hem bend formed in the aluminum fin at the back face of the wood frame, with a small aluminum rectangle tab being inserted inside the hem, then fastened to the wood frame.

10. A aluminum-faced air vent or louver in accordance with claim 8, wherein the means for anchoring the respective back corners of said fins to the edges of said wood frame comprises tabs at the back corners of said fins with the tabs being securely attached to the edges of the wood frame.

11. A aluminum-faced air vent or louver in accordance with claim 1, wherein the inside of the wood frame is wrapped with a painted aluminum strip to conceal the wood.

12. An aluminum-faced air vent or louver in accordance with claim 1, wherein the inside of the wood frame is painted black to conceal the wood.

13. An aluminum-faced air vent or louver in accordance with claim 1, wherein a bug screen is attached to the back side of the wood frame.

* * * * *